No. 638,589. Patented Dec. 5, 1899.
L. DE F. MUNGER.
COMBINED PNEUMATIC AND CUSHION TIRE.
(Application filed May 11, 1899.)
(No Model.)
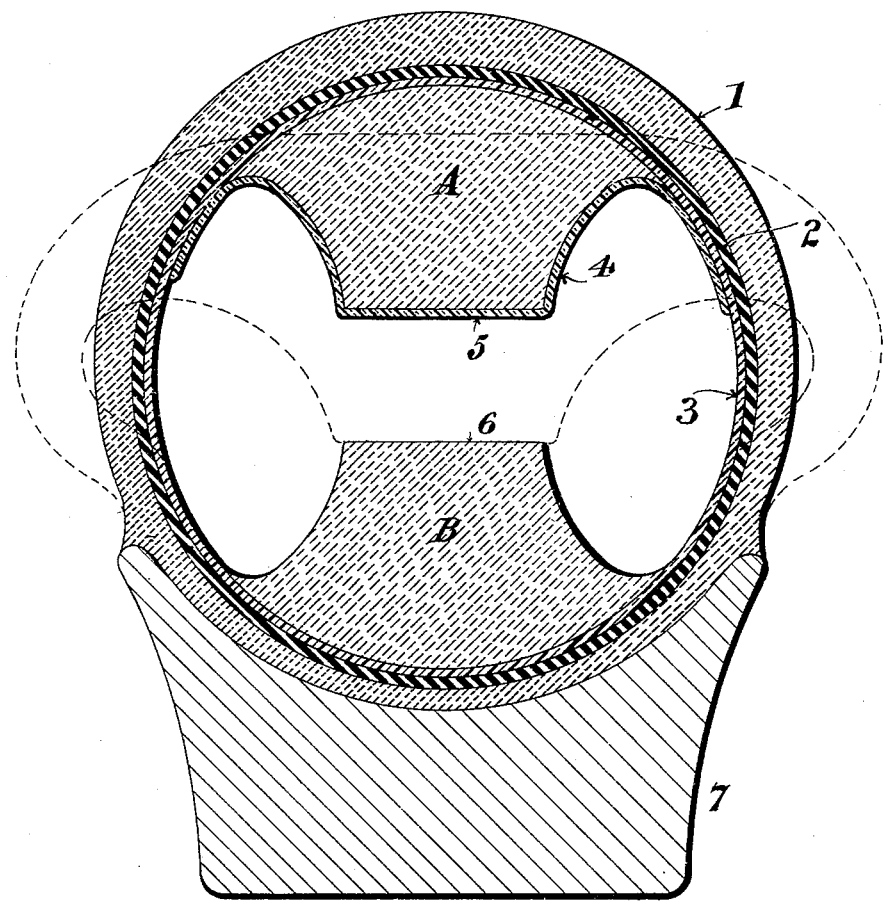
Witnesses:
Raphaël Netter
Catharine D. Morrill
Inventor
Louis de F. Munger
by T. D. Merwin Att'y.

UNITED STATES PATENT OFFICE.

LOUIS DE F. MUNGER, OF NEW YORK, N. Y., ASSIGNOR TO THE NATIONAL WHEEL AND TRACTION COMPANY, OF NEW YORK.

COMBINED PNEUMATIC AND CUSHION TIRE.

SPECIFICATION forming part of Letters Patent No. 638,589, dated December 5, 1899.

Application filed May 11, 1899. Serial No. 716,393. (No model.)

*To all whom it may concern:*

Be it known that I, LOUIS DE F. MUNGER, of New York, (Brooklyn,) county of Kings, State of New York, have invented a new and useful Combined Pneumatic and Cushion Tire, of which the following is a specification.

My invention relates to improvements in pneumatic tires, its object being to provide an improved construction which shall combine the functions of both pneumatic and solid-rubber tires for the purposes more fully hereinafter set forth.

It is desirable in a pneumatic tire, particularly for heavy traction purposes, that means be provided for the protection of the tire from injury in case of puncturing and deflating and also against the sudden abnormal strain or shock of excessive pressure at one point, as when the wheel meets a sharp obstruction, as well as against the destructive strain of overload.

To this end my invention consists in adapting to the ordinary pneumatic tire substantially circular in cross-section oppositely-disposed interior buffer ribs or cushions, one being adjacent the tread of the tire and the other the inner periphery of the tire which lies in the wheel-rim. These buffer-ribs are preferably of about the same form and dimensions and have adjacent parallel faces sufficiently separated to be normally out of contact. They are, however, positioned near enough to each other so that if the tire strikes against a sharp obstruction it will indent until the ribs are brought into contact with each other, and thus receive the load in the same manner as a solid-rubber tire for the time being without permitting the tire to entirely collapse, so as to injure its side walls. The ribs therefore serve the same function in respect to the tire that elastic cushions do for spring-vehicles. Similarly in case of the deflating of the tire or when the vehicle is overloaded the ribs will be brought into contact and will carry the load like solid-rubber tires without injury to the tube or rim of the wheel. It is further to be noted that the mass of the outer rib serves to thicken the tread of the tire, so as to serve as an additional precaution against puncturing. As a further safeguard the inner surface of the outer rib is covered with an impervious lining or coating vulcanized to the inner wall of the tube on each side. Thus the tire has the double protection of the ordinary inner tube outside of the outer rib and the connected coating or lining for the other face of the rib. Hence if a tire be punctured through the lining-tube air cannot pass through the porous mass of the rib, because of its impervious lining.

My invention is especially adapted to a pneumatic tire, in contradistinction to a cushion-tire, and must have on its inner periphery the air-tight lining referred to, which is composed of about ninety-five per cent. of pure rubber, and this inner lining in my tire must be formed on and be substantially an integral part of the tire itself in order to maintain a rigid connection of the buffers and tire and hold them in rigid relative position, so as to prevent collapsing and distortion of the tire and prevent the buffers from sliding over and crushing down within the spaces around the buffers, and the spaces on the sides of the buffers must extend to the inner edges of the tire in order to maintain at all times air-spaces around the buffers.

The preferred form of the ribs is shown in the drawing, in which the adjacent faces are shown flat, although, if desired, a different contour may be given so long as the surfaces are parallel, the load or pressure being thus distributed over the entire area of their adjacent faces when brought into contact.

The accompanying drawing forms part of this specification and shows my improved tire in cross-section. It is of the ordinary type, substantially circular in cross-section and with side walls of substantially uniform thickness. The exterior layer of material is indicated by 1.

2 represents the layers of fabric, and 3 the inner or air-tight tube.

A and B, respectively, represent the cushion or buffer ribs, oppositely disposed and longitudinally extended in the tire and made integral with the tire. The rib A is arranged adjacent to the tread and the rib B adjacent to the inner periphery of the tire or the wheel-rim 7. The inner surface of the rib A is preferably provided with the impervious lining 4, vulcanized on either side to the tube 3 and of like material, as an additional safeguard against leakage from a puncture through the tread of the tire.

The dotted lines illustrate the distortion of the tire when by reason of overload or deflation of the tire the buffer-ribs are brought into contact and serve the function of a solid-rubber or cushion tire.

By my construction a perfectly-sealed pneumatic tire of the ordinary closed tubular shape and having the usual continuous air-space therein is formed, and in my tire the air-spaces formed at the sides of the buffers and between the same and the edges of the tire correspond exactly to the air-cushion that is formed in an ordinary pneumatic tire when the same is under pressure and the central part depressed, so as to leave supporting-cushions of air on either side of the central part. Hence it will be seen, owing to the form and size of the air-spaces, that the buffers will not destroy the cushioning power of the air, but the resiliency and buoyancy of the ordinary pneumatic tire will be retained. My invention therefore consists, essentially, of improvements in a pneumatic tire and differs materially from those cushion-tires in which a small interior hole is provided to give a greater resiliency to the tire, as the spaces in the latter are provided to enable the tire to yield and collapse, while the spaces in my tire are provided to contain air under pressure, by means of which the too-ready yielding of the tire is prevented, and which spaces correspond to the air-space of an ordinary pneumatic tire. My tire differs, however, from the ordinary pneumatic tire in providing by the addition of the buffer a thickened tread-surface which will not flatten out to as great a degree and will therefore offer less frictional resistance to the ground.

Having thus described my invention, what I claim is—

1. A pneumatic, non-collapsible, cylindrical, continuous tire provided with interior buffers on the inner periphery of the air-tube, one buffer adjacent to the tread of the tire and the other directly opposite thereto, and air-spaces between and on both sides of said buffers extending entirely across the tire to the air-tube, substantially as described.

2. A pneumatic continuous tire circular in cross-section provided with an air-tube and interior buffers, one being adjacent to the tread of the tire and the other adjacent to the rim, said buffers made integral with the said tube or inner lining of the tire, substantially as described.

3. A combined pneumatic and cushion tire, comprising an outer tube, its impervious lining, a pair of cushion-ribs arranged within the same, one adjacent the tread and the other adjacent the wheel-rim and having parallel adjacent faces, and an impervious lining or coating covering the inner surface of the outer rib and joined to the lining of the tube, substantially as and for the purposes specified.

Signed at New York city, New York, this 9th day of May, 1899.

LOUIS DE F. MUNGER.

Witnesses:
AUGUSTUS LEE, Jr.,
T. D. MERWIN.